United States Patent [19]

Zweekly

[11] 4,194,862
[45] Mar. 25, 1980

[54] INDEXABLE INSERT DRILL

[75] Inventor: Raymond T. Zweekly, Royal Oak, Mich.

[73] Assignee: The Valeron Corporation, Oak Park, Mich.

[21] Appl. No.: 939,443

[22] Filed: Sep. 5, 1978

[51] Int. Cl.² ............................................. B23B 51/00
[52] U.S. Cl. ................................. 408/224; 408/186; 408/199; 408/211; 408/231; 408/705; 408/713
[58] Field of Search ............... 408/186, 199, 231, 211, 408/223, 238, 224, 239, 240, 705, 713

[56] References Cited

U.S. PATENT DOCUMENTS

| | | | |
|---|---|---|---|
| 2,630,725 | 3/1953 | Black | 408/224 |
| 3,213,716 | 10/1965 | Getts | 408/713 |
| 3,673,656 | 7/1972 | Gerchow | 408/224 |

*Primary Examiner*—Harrison L. Hinson

[57] ABSTRACT

An indexable insert drill employing a plurality of inserts located substantially in a single radial plane characterized by a round innermost insert having its arcuate cutting edge extending across the axial center line of the drill. One or more supplemental inserts, preferably square in configuration and including chip interruption notches positioned for positive axial lead, continue the cutting action radially beyond the arcuate center cut of the round insert with an outermost corner adapted to finish cut the side wall diameter of the hole.

22 Claims, 14 Drawing Figures

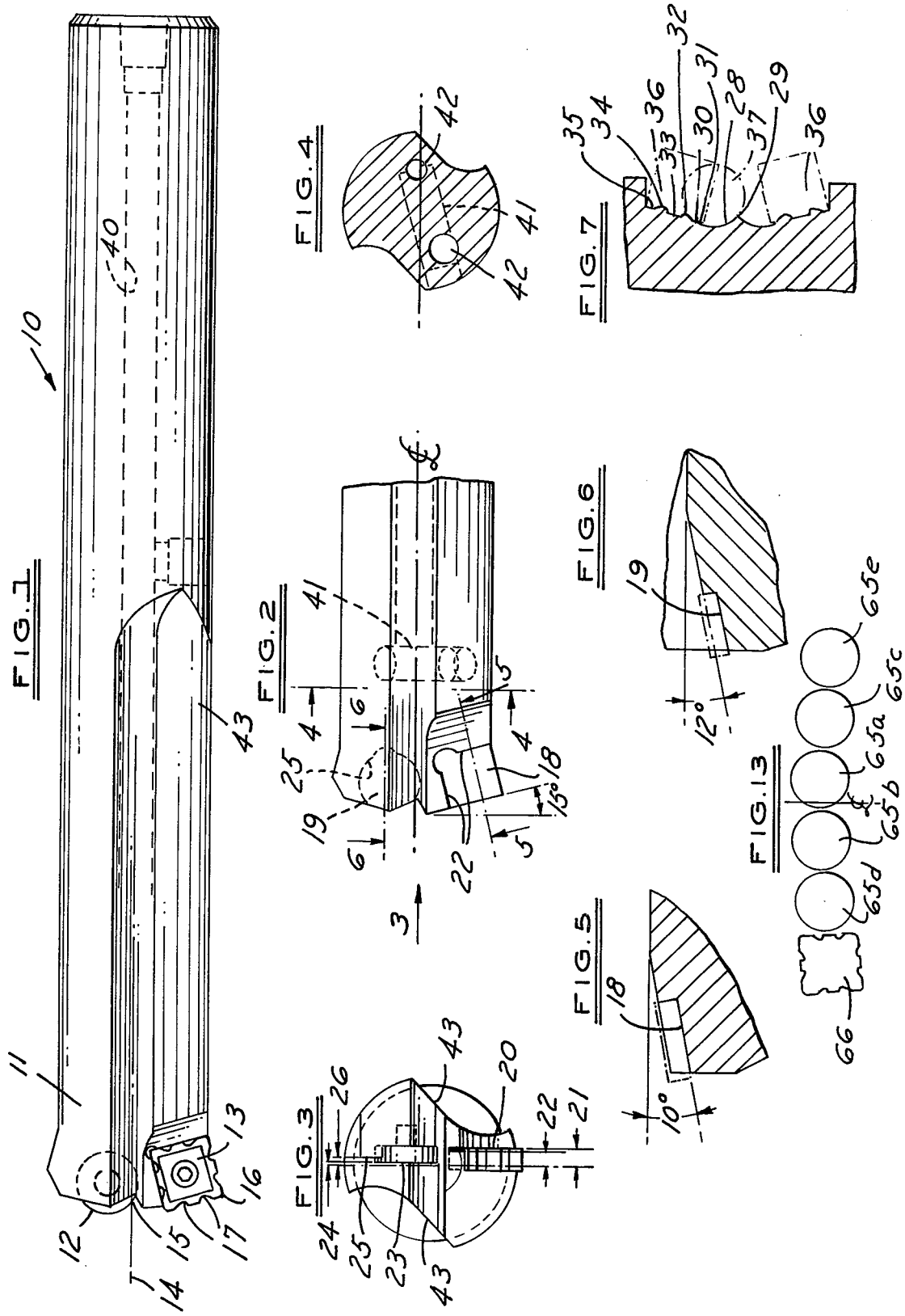

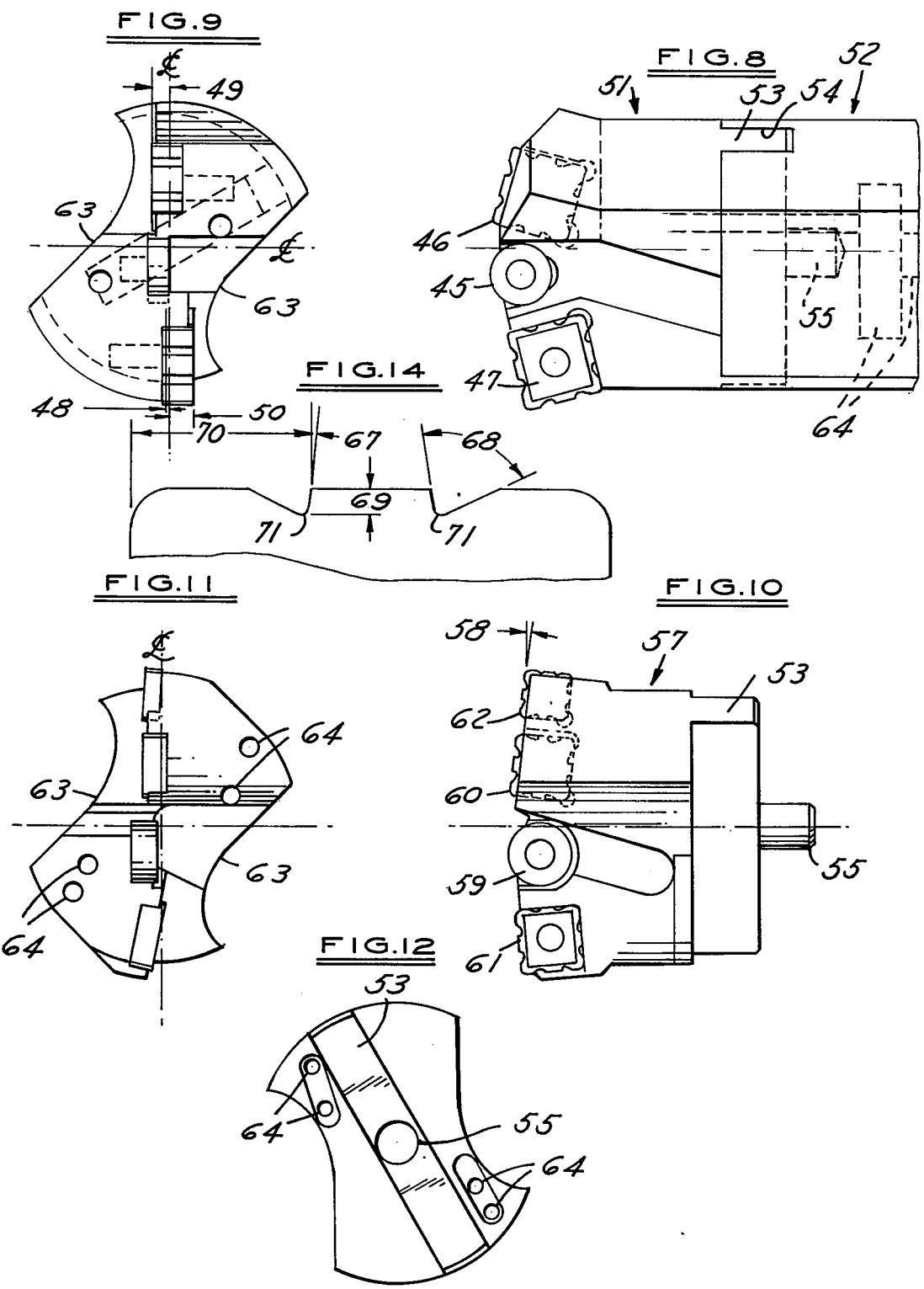

INDEXABLE INSERT DRILL

BACKGROUND OF THE INVENTION

An indexable insert drill has been previously developed as disclosed in co-pending application Ser. No. 789,354 employing a pair of inserts having a lead angle in the range of 0° to 5° which either may be positive or negative, the cutting edges of which sweep through a common cone of revolution with one radially inner insert having an arcuate corner extending across the drill axis and the other radially overlapping outer insert having an outer arcuate corner establishing the outer cutting periphery and diameter of the drill. This is the closest specific prior construction of which applicant is aware with the following issued U.S. patents completing the most pertinent prior art known to applicant: U.S. Pat. Nos. 3,938,231 3,540,323, 3,963,365, 3,791,001, 4,047,826 and 3,816,018, the last five patents having been cited in said co-pending application currently awaiting notice of allowance.

SUMMARY OF THE PRESENT INVENTION

The improvement of the round center insert disclosed herein relative to the radiused square center insert drill of said co-pending application comprises improved stability of centering action together with the advantage of infinite indexing of the most critical center cutting edge. The circular arc of the cutting edge of the radially innermost round insert provides a symmetrical entering centering groove which is free of any radially deflecting force associated with a non-symmetrical entering cutting edge.

DESCRIPTION OF THE DRAWINGS

FIG. 1 is a side elevation of an indexable insert drill in accordance with the present invention;

FIG. 2 is an enlarged fragmentary view of the cutting end of the drill body with the inserts omitted;

FIG. 3 is a cutting end view taken along the line 3 of FIG. 2 with the two inserts of FIG. 1 shown in place; (but omitting rake angles for simplification)

FIG. 4 is a sectional view taken along the line 4—4 of FIG. 2;

FIG. 5 is a fragmentary sectional view taken along the line 5—5 of FIG. 2;

FIG. 6 is a fragmentary sectional view taken along the line 6—6 of FIG. 2;

FIG. 7 is a fragmentary sectional view illustrating the cutting profile in a workpiece;

FIG. 8 is a fragmentary side elevation of the cutting end of a drill modified to include a second square insert in a three insert embodiment;

FIG. 9 is an end view of the modified drill of FIG. 8; (omitting rake angles of the inserts)

FIG. 10 is a further modified embodiment employing four cutting elements in a detachable cutting head adapted for selective assembly in a drill shank such as shown in FIG. 8;

FIG. 11 is an end view of the FIG. 10 modification; (omitting rake angles) and

FIG. 12 is an end view of the shank illustrating the slotted construction adapted for assembly with a cutting head such as shown in FIGS. 8 and 10.

FIG. 13 is a schematic view showing a further modification wherein a plurality of round inserts are combined with a single outermost square insert;

FIG. 14 is an enlarged view of one edge of the square inserts showing the preferred form of the chip splitting notch of the square inserts.

DESCRIPTION OF THE PREFERRED EMBODIMENTS

With reference to FIG. 1, the present indexable drill comprises a cylindrical shank 10 having a cutting end 11 provided with a center cutting round indexable insert 12 and an outer cutting square indexable insert 13.

The inserts 12 and 13 are preferably constructed with side walls normal to the cutting face to accommodate turnover indexing as well as four side indexing for each face in the case of insert 13 and infinite indexing for each face in the case of the round insert 12. For clarity of illustration the rake angles of the inserts are not shown in FIG. 3; however, the pocket 18 as indicated in FIGS. 2 and 5 has an axial rake negative 10° angle while the pocket 19 of the round insert is provided with a 12° negative rake angle illustrated in FIG. 6.

As shown in FIG. 3 the cutting edge 20 of the square insert is located ahead of center to provide a negative radial rake—for example 0.143" as shown at 21 in an embodiment employing ½" square and round inserts 3/16 " thick—while the shoulders indicated at 22 extend slightly below the cutting face of the insert, for example approximately 0.113" ahead of center. In the case of the round insert 12 the leading tip of the cutting edge 23 extends slightly below the center line, in the order of 0.028" as indicated at 24 while, as a result of the negative axial rake the cutting edge at a point adjacent the axis of the drill is approximately 0.005" below the center line. The pocket shoulder 25 for the round insert extends slightly below the cutting edge of the insert in the order of 0.050" below center as indicated at 26. As shown in FIG. 2 the square insert pocket 18 provides a 75° positive lead and is located so that the cutting edge of the insert will lie along the 15° angle slightly, in the order of 0.002", behind the round insert at the point of overlap in the cone of cutting.

With reference to FIG. 7 the cutting profile in a workpiece established by this arrangement of cutting inserts will be seen to include an initial circular arc annular groove 28 established by initial contact of the round insert cutting edge terminating at a center point cone 29 and a radially outer perimeter 30 intersected by the cutting edge 31 of the square insert which extends outwardly to an annular ridge 32, a straight section 33 an annular ridge 34 an outer straight section 35 and terminal corner corresponding with the drill diameter. It will be understood that while two of the square inserts 36 are illustrated in phantom in FIG. 7 only one illustrated at the lower extremity of the figure will be cutting in relation to the round insert 37 the other phantom square insert being superimposed to merely illustrate the overlapping relation relative to the round insert.

With reference to FIGS. 1, 2 and 4 provision for deep drilling includes a central passage 40, cross passage 41 connecting passages 42 and extensive longitudinal flutes 43 for pressurized coolant flushing of chips. In this connection it is important that the chip breaker grooves 17 be included in the square insert 13 in order to assure chip size compatible with clearance by flushing action. A preferred form of chip splitting groove is described in detail hereafter with reference to FIG. 14.

The two insert embodiments illustrated in FIGS. 1 to 7 are appropriate for a drill diameter of 1 ½" employing standard ½" round and square inserts. With reference to FIGS. 8 and 9 a modification is shown employing a single round insert 45 and a pair of square inserts 46, 47 suitable for use in drilling larger diameter holes—for example by using a ½" standard round insert 45 and ⅜" square inserts 46 and 47, a drill diameter of 2 ½" may be produced. Pocket geometry similar to that of the previously described two insert embodiment is used for the inserts 45 and 46, it being important that the radially innermost cutting point of the square insert overlap the cone cut by the round insert as shown in FIG. 7. The outer square insert 47 must in turn overlap the cone cut by the square insert 46 and perform its cutting action as an extension of such cone.

As in the two insert embodiment the cutting edge adjacent the center line of the round insert lies slightly below the center line, in order of 0.005" as indicated at 48 while the cutting edge of the square insert 46 is ahead of the center line as indicated at 49 and the cutting edge of the second square insert 47 is likewise ahead of the center line as indicated at 50 to provide side wall clearance. Here again axial pocket angles of 12° for the round insert as shown in FIG. 6 and 10° for a square insert as indicated in FIG. 5 may be employed to provide negative rake although omitted from FIG. 9 for simplification of illustration. As indicated above, the embodiments of FIGS. 8 and 9 may be adapted to produce a cutting diameter of 2 ½" by employing a standard round insert 45 of ½" diameter together with two ⅜" square inserts. With such square inserts ¼" thick, satisfactory results have been obtained with a 0.135" dimension at 49 and 0.196" at 50 as shown in FIG. 9.

In this embodiment a detachable cutting head 51 is assembled to a drill shank 52 utilizing a transverse drive key 53 integrally formed at the inner end of the head engaging transverse slot 54 at the end of the shank together with an integral pilot pin 55 engaging in pilot hole 56 in the shank. Suitable clamping means not shown may be employed to retain the head assembled to the shank. In FIG. 10 a similar detachable head 57 is illustrated independently of the shank and showing a combination of four inserts adapted to cut the same diameter hole as the three insert embodiments of FIGS. 8 and 9. In this case smaller square inserts are set at a smaller positive lead angle 58 in the order of 5°. As an example a ½" diameter round insert 59 combined with ¼" square insert 60 and 61 and a ⅜" square insert 62 having overlapping relationship in the common conical cutting surface can also be adapted to cut a 2 ½" diameter drilled hole.

With reference to FIG. 13 a further modification is schematically illustrated wherein a plurality of round inserts are combined with a single outermost square insert. The round inserts on each side such as 65a, 65c and 65e may be closely spaced in suitable round pockets providing an appropriate positive lead comparable to the embodiment of FIG. 10 with inserts on alternate sides spaced in intermediate overlapping relation to provide progressive increased radius of cutting action in the successive order of 65a, b, c, d, and e, the outer corner of the square insert 66 providing the finish wall cut of the drilled hole.

With reference to FIG. 14 a preferred form of chip splitting notch for all of the square inserts is shown subject to the qualification that the angle 67 corresponds to the lead angle such as 58 in FIG. 10 whereby the radially innermost edge of the outermost notch will extend substantially parallel to the axis of the drill assuring a chip splitting at such edge. The notch is completed by an acute angle 68 in the order of 70° and extends to a depth 69 in the order of 0.020". The inner edges of the notches are spaced from the insert corners a distance 70 which may vary with the insert size but is equal to approximately one third of the insert width. A slight notch radius 71 in the order of 0.010" is provided at the bottom with each notch. This form of notch assures chip splitting at the radially outermost notch as distinguished from a more conventional arcuate groove which merely creates a chip of varying thickness without positive splitting.

In each of the embodiments the inserts are generally nearly aligned in a single radial plane to accommodate chip passage in a pair of axially extending gullets which will not unduly weaken the drill. In every case the round insert at the center has been found to stabilize the entry and cooperate with the outer square insert or inserts to provide fast accurate drilling. In the case of the FIG. 10 to 12 embodiment the small size of insert relative to drill diameter and gullet passages 63 have been found to produce smaller chips facilitating coolant flushing through passages 64 suitably connected to a central channel in the drill shank as indicated at 64 in FIG. 8.

With reference to FIG. 9, for example, the gullet passages 63 will be seen to have arcuate extremities adjacent the cutting faces of the inserts adapted to curl the chips as they leave the cutting edges. It will be seen that such arcuate extremities actually extend past a radial line from the center of the drill through the outermost point of the gullet intersection with the outer perimeter of the drill thus leading the chip to an acute angle relative to the wall of the drilled hole to augment the curling action into the flute opening and prevent chip wedging between the outer perimeter of the drill and the workpiece hole.

The combination of eight indexable positions for each of the square inserts and the infinite number on both sides of the round inserts provide high rate and high total drilling capacity with unexpected stability, freedom from chatter and straightness of cutting action.

Using standard available round and square inserts with suitable overlap as described herein, a range of drill sizes from 1 to 2 ½" may be readily provided. Negative rake inserts are preferred for maximum indexing capabilities although it will be understood that positive inserts with suitable pockets could also be employed with satisfactory results.

I claim:

1. An indexable insert drill comprising a drill body a pair of insert pockets formed at one end of said body, one of said pockets having means for locating a first round insert having a circular arcuate cutting edge extending with its foremost point offset from the drill axis by a fractional portion of the insert radius, said cutting edge extending from said foremost point substantially through and past said axis.

2. An indexable insert drill as set forth in claim 1 wherein said offset comprises a major fractional portion of the insert radius.

3. An indexable insert drill as set forth in claim 1 wherein said offset comprises a major fractional portion of the insert radius in the order of 84%.

4. An indexable insert drill as set forth in claim 1 wherein said cutting edge extends from said foremost point past said axis slightly on the trailing side of a plane containing said axis and said foremost point.

5. An indexable insert drill as set forth in claim 1 wherein said cutting edge extends from said foremost point past said axis slightly on the trailing side of a plane containing said axis and said foremost point in the order of 0.005" below said axis at the closest point.

6. An indexable insert drill as set forth in claim 1 wherein said other pocket is located radially outward of said first pocket for locating a second insert with its cutting edge in overlapping cutting relation with a portion of said first insert cutting edge extending radially outwardly of said foremost point.

7. An indexable insert drill as set forth in claim 6 wherein said second pocket is on the opposite side of the drill axis from said first insert for positioning an insert cutting in an opposite direction.

8. An indexable insert drill as set forth in claim 7 wherein said inserts are positioned for positive lead cutting action.

9. An indexable insert drill as set forth in claim 8 wherein said second insert is square in general configuration.

10. An indexable insert drill as set forth in claim 9 wherein the cutting edges of said square insert are provided with chip breaking notches.

11. An indexable insert drill as set forth in claim 9 wherein multiple square insert pockets are provided.

12. An indexable insert drill as set forth in claim 9 wherein multiple square insert pockets are provided extending generally in a single diametric plane.

13. An indexable insert drill as set forth in claim 9 wherein multiple square insert pockets are provided extending generally in a single diametric plane and spaced alternately on opposite sides of said axis at progressively greater radial distance.

14. An indexable insert drill as set forth in claim 9 wherein multiple square insert pockets are provided and the cutting edges of said square inserts extend generally in a common cone of revolution with overlapping radial extensions.

15. An indexable insert drill as set forth in claim 9 wherein each of the inserts is provided with parallel cutting and seating faces joined by normal side walls.

16. An indexable insert drill as set forth in claim 15 wherein each of said pockets is provided with a negative axial rake angle.

17. An indexable insert drill as set forth in claim 15 wherein each of said pockets is provided with a negative axial rake angle in the order of 10°.

18. An indexable insert drill as set forth in claim 7 wherein a plurality of round insert pockets are provided at progressive overlapping radial positions.

19. An indexable insert drill as set forth in claim 7 wherein a plurality of round insert pockets are provided at progressive overlapping radial positions and a final radially outermost polygonal insert pocket is provided to accommodate an insert having a cutting corner appropriate for finish cutting the drilled hole wall.

20. An indexable insert drill as set forth in claim 10 wherein at least one of said notch in each cutting edge has an edge extending substantially parallel to the drill axis.

21. An indexable insert drill as set forth in claim 7 including chip clearance gullets extending longitudinally back from the cutting point of the drill on diametrically opposite sides, each of said gullets having an arcuate extremity adjacent the cutting edge of one of said inserts.

22. An indexable insert drill as set forth in claim 21 wherein said arcuate extremity terminates in an acute angle at its intersection with the outermost perimeter of the drill.

* * * * *